Patented July 25, 1933　　　　　　　　　　　　　　　　1,919,264

UNITED STATES PATENT OFFICE

WILLIAM C. TAYLOR, OF CORNING, NEW YORK, ASSIGNOR TO CORNING GLASS WORKS, OF CORNING, NEW YORK, A CORPORATION OF NEW YORK

LOW EXPANSION BLACK GLASS AND METHOD OF PRODUCING IT

No Drawing.　　　Application filed December 17, 1930. Serial No. 503,109.

This invention relates to black opaque glasses and to compositions therefor and it relates more particularly to low expansion black glasses which are opaque in sections as thin as 1 or 2 mm and which are suitable for use in the fabrication of tubing for luminous signs and the like.

The manufacture of luminescent signs involves the sealing together of pieces of glass tubing of various colors and the various pieces of glass used in fabricating a sign must be of practically the same expansion coefficient to promote proper sealing. There have thus come to be two general types of signs, one formed of soft glasses or glasses of high expansion and the other of low expansion glasses. In order that the individual letters or figures of such signs may appear unconnected when illuminated, it is desirable to use opaque black tubing in connecting them together. The methods of accomplishing this comprise the use of tubing colored black by means of suitable coloring agents or the application of opaquing mediums such as black paint, tape, etc., to those parts of the sign which are intended to be invisible during illumination. Since paint and tape are subject to deterioration and loss of opacity, it is obvious that the better method is the use of tubing which is inherently black in color.

Black glasses are ordinarily produced by the use of such coloring agents as, for example, cobalt, nickel, manganese, chromium, iron, carbon, sulphur, etc. Black tubing of high expansion glass has sucessfully been made by the use of such coloring agents and this has not been essentially difficult because any change in expansion coefficient which is caused by the addition of sufficient coloring agent to produce opacity is easily compensated by a corresponding change in the composition of the base glass. The expansion coefficient of low expansion glasses is not so easily controlled however and, insofar as I am aware, it has not been possible to produce glass of extremely low expansion colored black and completely opaque to visible light in sections of 2 mm or less in thickness, because the above recited coloring agents do not impart sufficient coloration to accomplish the desired result unless the amount thereof be increased to such an extent as to cause an increase in the expansion coefficient of the glass and a resultant impairment of its stability.

It is the object of this invention to color borosilicate glass, particularly low expansion borosilicate glass, so that it will be lustrous black and perfectly opaque in sections of 1 mm or more in thickness without any substantial impairment in the stability or expansion coefficient of the base glass.

I have discovered that I can produce such glass by adding to the batch relatively small amounts of iron and titanium and then melting the batch preferably under reducing conditions. My invention further resides in the discovery that when iron and titanium or compounds thereof are introduced into a borosilicate glass which contains little or no amount of second group elements, the intensity of the color thus produced is considerably more dense than that which would result from a mere additive effect. That is to say, of three pieces of glass having the same thickness and base composition, the first containing iron alone, the second containing titanium alone, and the third containing the combined iron and titanium contents of the first and second, the color density of the third glass is considerably greater than that of glasses one and two superimposed upon each other. This phenomenon is effective in both oxidized and reduced borosilicate glasses but is more pronounced in the case of reduced glass.

The following batches which I have melted will further illustrate my invention.

| | A | B | C | D | E | F |
|---|---|---|---|---|---|---|
| Sand | 315 | 315 | 315 | 315 | 315 | 315 |
| Borax | 90 | 90 | 90 | 115 | 115 | 115 |
| Boric acid | 90 | 90 | 90 | 75 | 75 | 75 |
| Titania | | 20 | 20 | | 20 | 20 |
| Ferric oxide | 20 | 20 | | 20 | 20 | |
| Niter | 12 | 12 | 12 | | | |
| Starch | | | | 1 | 1 | 1 |
| Thickness of sample | 1 mm | 1 mm | 1 mm | 1 mm | 1 mm | 1 mm |
| Color of transmitted light | Dark greenish amber | No transmission lustrous black | Pale brownish gray | Dark gray | No transmission lustrous black | Deep blue |

| | G | H | I |
|---|---|---|---|
| Sand | 315 | 315 | 315 |
| Borax | 115 | 115 | 115 |
| Boric acid | 75 | 75 | 75 |
| Titania | | 10 | 10 |
| Ferric oxide | 10 | 10 | |
| Niter | | | |
| Starch | 1 | 1 | 1 |
| Thickness of sample | 2 mm | 2 mm | 2 mm |
| Color of transmitted light | Light gray | No transmission lustrous black | Light purplish gray |

It is to be noted that batches "A" to "C" inclusive contain niter which is an oxidizing agent while batches "D" to "I" inclusive contain a reducing agent, namely starch, but no oxidizing agent. If the stated samples of the glasses resulting form batches "A" and "C" which are each 1 mm in thickness are superimposed, a certain amount of visible light is transmitted therethrough. The same is true of the glasses resulting from batches "D" and "F" which are each 1 mm thick and also of glasses resulting from batches "G" and "I" which are each 2 mm thick. The glasses resulting from batches "B", "E" and "H" are individually opaque in their respective thicknesses as noted.

From the above it will be obvious that batches "B", "E" and "H" are specific embodiments of my invention and on melting they produce glasses of approximately the following percentage compositions as calculated from their respective batches:

|  | B | E | H |
|---|---|---|---|
| $SiO_2$ | 68.8 | 68.8 | 71.9 |
| $Na_2O$ | 4.1 | 4.1 | 4.3 |
| $B_2O_3$ | 18.3 | 18.3 | 19.2 |
| $Fe_2O_3$ | 4.4 | 4.4 | 2.3 |
| $TiO_2$ | 4.4 | 4.4 | 2.3 |

It will further be evident that by means of my invention I am able to obtain absolute opacity to visible light with relatively small amounts of coloring agent as is shown in glass "H" which contains only about 2% each of iron and titanium, calculated as the oxides and which is opaque in 2 mm thickness.

The development of suitable color in glasses in accordance with this invention is influenced by the following considerations. For the development of maximum coloration I find it desirable to use an amount of iron which is equal to or greater than the amount of titanium. I have also found that the greatest density is obtained in reduced glasses although oxidized glasses containing somewhat larger amounts of iron and titanium will possess equally as dense coloration. I have further found that the presence of lime causes either complete loss of the so-called black coloration as, for example, in the case of ordinary soda lime glasses or at least causes such a substantial diminution thereof as to render the same unsuitable for use as in the case of borosilicate glasses containing appreciable amounts of lime. Although I have not tried other second group elements, my past experience and knowledge of glass composition leads me to the belief that in general for best results the presence of second group elements is to be avoided. I have also found that the compositions best suited for practicing my invention are low expansion borosilicate glasses of the type disclosed in the Sullivan and Taylor Patent 1,304,623 although it is my belief that other borosilicate glasses which contain little if any of the second group elements will accomplish some of the results specified and will fall within the broader limits and scope of my invention.

Having thus disclosed my invention, what I claim is:

1. A black borosilicate glass which is completely opaque to visible light and which contains iron and titanium sufficient in amount to color the glass black as the coloring agents.

2. A black borosilicate glass which in a thickness of 2 mm is completely opaque to visible light, which contains at least 2% each of iron and titanium calculated as oxides.

3. A black borosilicate glass which in a thickness of 2 mm. is completely opaque to visible light, which contains at least 2% each of iron and titanium calculated as oxides and which is substantially free from elements of the second periodic group.

4. A borosilicate glass batch which contains iron and titanium in quantities sufficient to give at least 2% of each calculated as oxides in the finished glass.

5. A borosilicate glass batch which contains iron and titanium in quantities sufficient to give at least 2% of each calculated as oxides in the finished glass, and a reducing agent.

6. A borosilicate glass batch which is substantially free from elements of the second periodic group and which contains iron and titanium in quantities sufficient to give at least 2% of each calculated as oxides in the finished glass, and a reducing agent.

7. The method of producing a black low expansion borosilicate glass which in a thickness of 2 mm is opaque to visible light which includes adding to the batch therefor sufficient iron and titanium to give at least 2% of each calculated as oxides in the finished glass.

8. The method of producing an opaque black borosilicate glass containing iron oxide which includes adding to the batch therefor an amount of titanium oxide the amounts of iron oxide and titanium oxide being small but sufficient to conjointly color the glass black.

9. The method of producing an opaque black borosilicate glass containing at least 2% of ferrous oxide which includes adding to the batch therefor at least 2% of titanium oxide.

10. The method of producing an opaque black borosilicate glass which is substantially free from elements of the second periodic group and containing at least 2% of ferrous oxide which includes adding to the batch therefor at least 2% of titanium oxide.

WILLIAM C. TAYLOR.